(12) United States Patent
Place

(10) Patent No.: US 12,125,052 B2
(45) Date of Patent: Oct. 22, 2024

(54) SPEECH ANALYSIS MODELS AS A SERVICE

(71) Applicant: Cogito Corporation, Boston, MA (US)

(72) Inventor: Skyler Place, Boston, MA (US)

(73) Assignee: Cogito Corporation, Boston, MA (US)

(*) Notice: Subject to any disclaimer, the term of this patent is extended or adjusted under 35 U.S.C. 154(b) by 228 days.

(21) Appl. No.: 17/541,216

(22) Filed: Dec. 2, 2021

(65) Prior Publication Data

US 2022/0172231 A1    Jun. 2, 2022

Related U.S. Application Data

(60) Provisional application No. 63/120,566, filed on Dec. 2, 2020.

(51) Int. Cl.
*G06Q 30/0201* (2023.01)
*G10L 15/30* (2013.01)
*G10L 25/63* (2013.01)

(52) U.S. Cl.
CPC .......... *G06Q 30/0201* (2013.01); *G10L 15/30* (2013.01); *G10L 25/63* (2013.01)

(58) Field of Classification Search
CPC ...... G06Q 30/0201; G10L 15/30; G10L 25/63
See application file for complete search history.

(56) References Cited

U.S. PATENT DOCUMENTS

| | | | |
|---|---|---|---|
| 2016/0365095 A1* | 12/2016 | Lousky | G10L 17/04 |
| 2019/0027141 A1* | 1/2019 | Strong | G10L 15/1815 |
| 2020/0310888 A1* | 10/2020 | Gopalan | G06F 21/31 |

* cited by examiner

*Primary Examiner* — Fan S Tsang
*Assistant Examiner* — David Siegel
(74) *Attorney, Agent, or Firm* — Kim IP Law Group LLC

(57) ABSTRACT

A model as a service system in which call participants' emotional or mental state is recognized by the system based on aspects of voice-based audio data collected from the call participants' communication devices, in particular the state of a company's customers. The system provides an algorithm for use by a company employee during an ongoing communication with a customer of the company. The voice-based data is recorded from the participants' communication devices, and sent to a server that analyzes the recordings for characteristics that reflect the current emotional or mental state of call participants, particularly the state of the customer. The characteristics are used to generate an algorithm that provides to a company participant suggestions for modifying aspects of their voice communication with the customer in real- or near real-time.

18 Claims, 3 Drawing Sheets

SPEECH ANALYSIS MODELS AS A SERVICE

FIELD OF THE DISCLOSURE

The present disclosure is generally related to the analysis of audio data to determine human emotional and/or mental state in order to create a predictive model to better identify a user's emotional and/or mental state.

BACKGROUND

Currently, there is a need to analyze voice-based audio data from a user (an enterprise of agents) that relates to a predictive model based upon unique business challenges, wherein the predictive model can output the probability of future actions of the user, specifically in call centers to better assist the user. There is also a need to allow the predictive model to be adaptable in order to determine the probabilities of future actions of users for various uses across different industries as well as for different purposes, such as customer satisfaction, employee assessment, or health of the user or employee. There is a need for a flexible service that allows users to define their own business interests and then create predictive models that can be specifically tuned to the user. In addition, there is also a need to determine the client's needs so that the predictive model can be fully utilized to provide the appropriate actions (based upon analysis of audio data) in order to determine the future actions of the users. Thus, there is a need in the art to provide a system that identifies human emotions and/or mental health states based on voice-based audio data which can be adapted based on how the system will be utilized and provide a model as service function.

BRIEF DESCRIPTIONS OF THE DRAWINGS

The accompanying drawings are included to provide a further understanding of the invention, and are incorporated in and constitute a part of this specification. The drawings illustrate disclosed exemplary embodiments and/or aspects and, together with the description, serve to explain the principles of the invention, the scope of which is defined by the claims.

Figure 5:
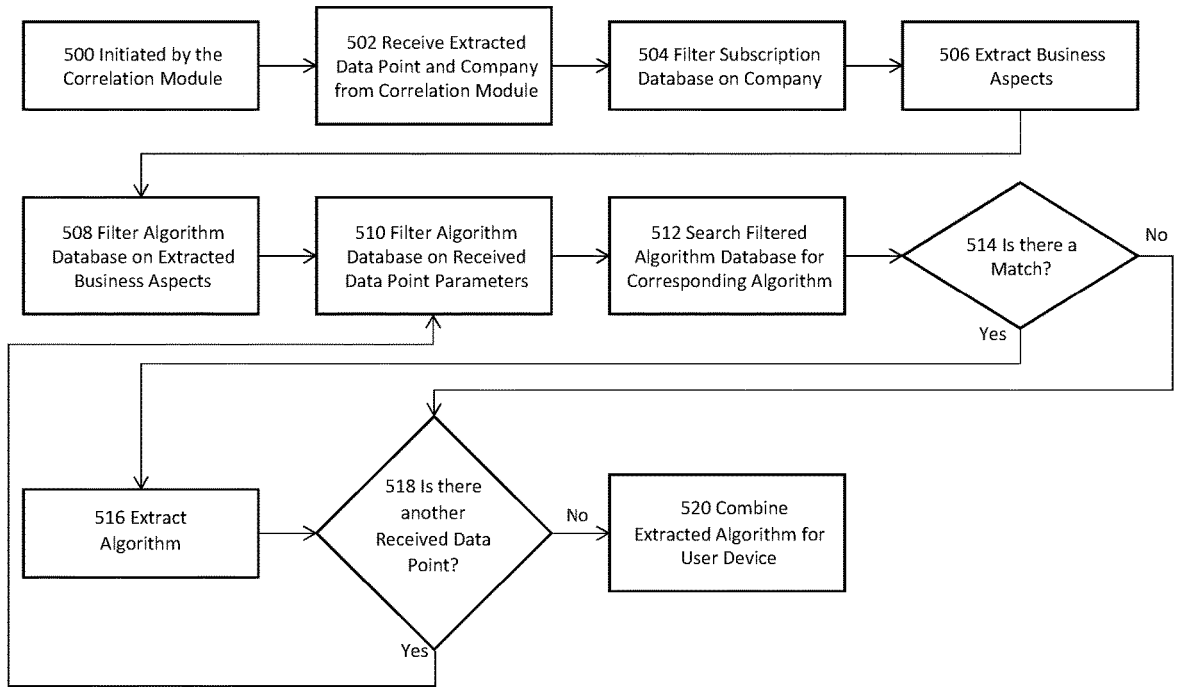

FIG. 5: Illustrates an Algo Creation Module of the system.

Figure 6:
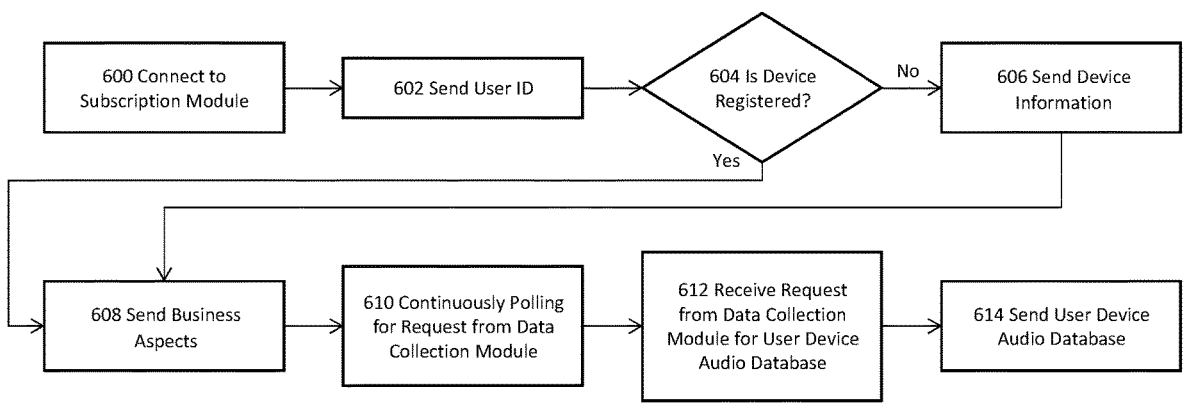

FIG. 6: Illustrates a User Device Base Module of the system.

DETAILED DESCRIPTION

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout this disclosure, various aspects of the subject disclosure can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the present disclosure can be practiced without one or more of the specific features or advantages of a particular exemplary embodiment. In other instances, additional features and advantages may be recognized in certain embodiments that may not be present in all exemplary embodiments of the subject disclosure.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
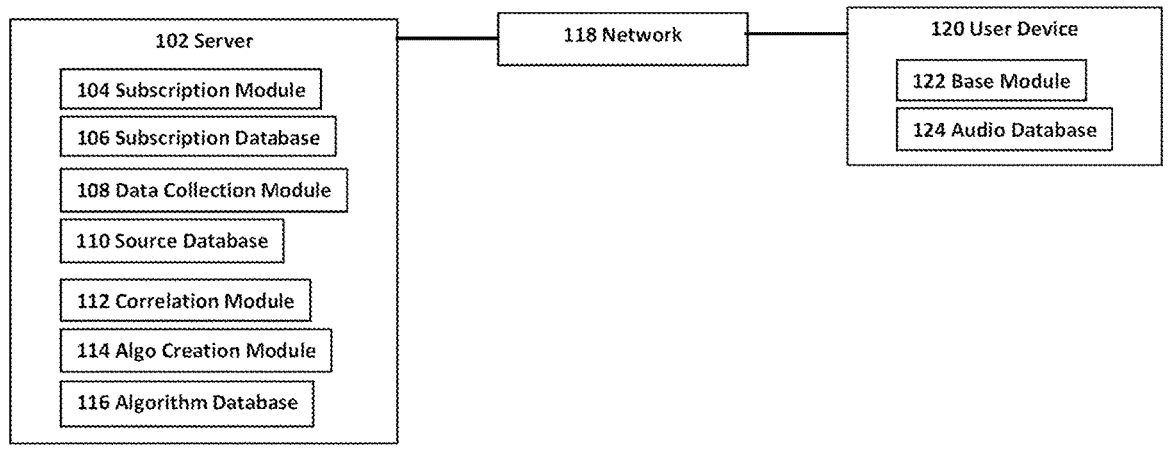
FIG. 1 Illustrates an exemplary Models as a Service System.

FIG. 1 is a high level block diagram of a system for a Models as a Service System. The system comprises a Server 102, that may be or include a platform managed by a data (e.g., behavioral data, such as sensor and usage data) analysis service provider, a scalable cloud environment, a hosted centralized onsite server, or the like. The Server 102 may also be communicatively coupled with third party platforms, for example one or more User Devices 120 communicatively coupled via network 118, in order to provide or perform services on data of the third party platform (e.g., audio data). The Server 102 processes (e.g., analyses) received data (e.g., audio data, sensor data, usage data, and the like), for example from a User Device 120, such as by executing or operating a Subscription Module 104, Data Collection Module 108, Correlation Module 112, Algo Creation Module 114, and by storing and/or extracting data from the Subscription Database 106, Source Database 110 and Algorithm Database 116, of server 102.

The Subscription Module 104, which connects to the User Device 120 via Network 118, determines if the User Device 120 is currently subscribed to the services provided by the Server 102. If not, the system allows the User Device 120 to purchase a subscription of the services provided by the Server 102, receives business aspects important to the client or User Device 120, for example, return to health, return to work, buying or purchasing from potential customers, health and wellness of agent, etc., stores the data in the Subscription Database 106 and initiates the Data Collection Module 108. The Subscription Database 106 contains data of each client or User Device 120 that is currently subscribed to the services offered by the Server 102, as well as contains the business aspects important to the client or User Device 120, such as return to health, return to work, buying or purchasing from potential customers, health and wellness of agent, or the like. The Data Collection Module 108 communicatively connects to the User Device Base Module 122 via the Network 118 in order to send a request for information of the User Device, such as a User Device Audio Database 124, then receives the requested information such as the User Device Audio Database 124, stores the data in the Source Database 110, and initiates the Correlation Module 112. In some embodiments, the Data Collection Module 108 may perform its functions in real-time or near real-time.

The Source Database 110 contains the audio data or other information collected from the User Device 120 and is the data that is used in processes performed in the Correlation Module 112. The Correlation Module 112 is initiated by the Data Collection Module 108 and performs various correlations on the data stored in the Source Database 110 in order to determine key features of the audio data or other information that can be used in the Algo Creation Module 114, and initiates the Algo Creation Module 114. In some embodiments, the features identified by the Correlation Module 112 may be or include one or more of pitch or frequency, volume, tone, length of call or interaction, and variations of pitch or tone, any of which can be used by the Algo Creation Module 114 to identify characteristics to identify the user's current emotional and/or mental state. For example, the Correlation Module 112 may filter the Source Database 110 for information of a particular company, for example Comcast. The Correlation Module 112 selects a first parameter, e.g., the event time, so that the Source Database 110 is now filtered for the company (e.g., Comcast), and the first parameter (e.g., the event time). Then the Correlation Module 112 performs correlations between the first parameter and all of the other parameter data of the same company, e.g., an agent's speaking pace, the client's speaking pace, etc. If a correlation is found greater than a predetermined threshold, for example a correlation above 95%, this may be deemed to be highly correlated, which may be used to indicate that the correlation between those two parameters is of importance. For example, the event time and an agent's speaking pace may be highly correlated. If so, the most reoccurring data point may be extracted and stored. For example, if during a 15 minute event the agent's pace is 170 words per minute, then that data point may be extracted and information of the data point and the company may be sent to the Algo Creation Module 114, which is initiated by the Correlation Module 112.

The Algo Creation Module 114 receives the extracted data point and the company from the Correlation Module 112 (for example, during a 15 minute event the agent's pace is 170 words per minute within the company Comcast). The Algo Creation Module 114 may then extract the business aspects from the Subscription Database 106, for example the health and wellness of the agent, buying or purchasing from potential customers, stress levels, and the like. The Algo Creation Module 114 then filters the Algorithm Database 116 on the extracted business aspects and the received data point, and searches the Algorithm Database 116 for a corresponding algorithm. For example, a related business aspect may be the health and wellness of the agent, and the two parameters may be the event time and the agent's pace. The extracted algorithm may be, for example algorithm ID ET.AP.456, and the Algo Creation Module may extract a corresponding algorithm data file ET.AP.456.dat which has the rule "if agent pace is below extracted data point, notify agent to speak faster". The Algo Creation Module 114 may further determine if there are additional data points extracted from the Correlation Module 112, and if so, may combine the corresponding algorithms to create a customized algorithm for the specific client, company, or agent. The Algorithm Database 116 contains various algorithms, algorithm rules, and outcomes of the algorithms so they may be combined to determine a user's emotional and/or mental state. This may be applied on a case by case basis, and may be used for each of a plurality of User Devices 120.

The Network 118, may be or include a cloud or other communication network, and may be or include a wired and/or a wireless network. If wireless, the communication network may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The Network 118 may allow ubiquitous access to shared pools of configurable system resources and higher-level services that can be rapidly provisioned with minimal management effort, for example over Internet, and may rely on shared to achieve coherence and economies of scale, similar to how a public utility operates. Such a third-party cloud may thereby enable an organization to focus on its core business instead of expending resources on computer infrastructure and maintenance.

User Device 120 may be or include a laptop, smartphone, table, computer, or smart device. The User Device 120 may thus be a client device. The User Device Base Module 122 connects via Network 118 to the Subscription Module 104. If the User Device 120 is not subscribed to the services provided by the server, the User Device 120 subscribes to the services and inputs business aspects important to the User Device 120 or client, such as return to health, return to work, buying or purchasing from potential customers, health and wellness of agent, or the like. The User Device 120 then polls for a request from the Data Collection Module 108. Such polling may be continuous, regularly timed, or intermittent. When the User Device 120 receives a request from the Data Collection Module 108, it sends the User Device Audio Database 124 or other User Device 120 information to the Data Collection Module 108, and then returns to polling for a next request from the Data Collection Module 108. In embodiments, there may be a plurality of User Devices 120. The User Device Audio Database 124 contains the voice-based audio data of the interaction between the user and their client, and may be sent to the Server 102 to be collected as source data for the Correlation Module 112 in order to create and determine the appropriate algorithm to be used based on the user's specific needs.

Functioning of the Subscription Module 104 will now be explained with reference to FIG. 2. The process begins with the Subscription Module 104 receiving, from a User Device 120, a request for a connection, step 200. The Subscription Module 104 then connects to the User Device 120, step 202. The Subscription Module 104 receives the user ID from the User Device Base Module 122, step 204. For example, the user ID may be an identification tag for the user device or for the specific user connecting to the Server 102. An exemplary table from an exemplary Subscription Database 106 containing User IDs is shown below as Table 1, which will be further described hereinafter. The first example user ID shown is TS789654.

TABLE 1

| User ID | Company | Status | Business Aspect 1 | Business Aspect 2 | Business Aspect N |
|---|---|---|---|---|---|
| TS789654 | Comcast | Active | Health and Wellness of Agent | Buying/Purchasing from Potential Customers | Stress Levels |
| SH123456 | Comcast | Active | Health and Wellness of Agent | Buying/Purchasing from Potential Customers | Stress Levels |
| FE456789 | Alorica | Deactive | Return to Health | Health and Wellness of Agent | Return to Work |
| SW789123 | AT&T | Active | Stress Levels | Health and Wellness of Agent | Buying/Purchasing from Potential Customers |
| BU321657 | AT&T | Active | Stress Levels | Health and Wellness of Agent | Buying/Purchasing from Potential Customers |
| IL654729 | AT&T | Active | Stress Levels | Health and Wellness of Agent | Buying/Purchasing from Potential Customers |
| — | — | — | — | — | — |

Figure 2:
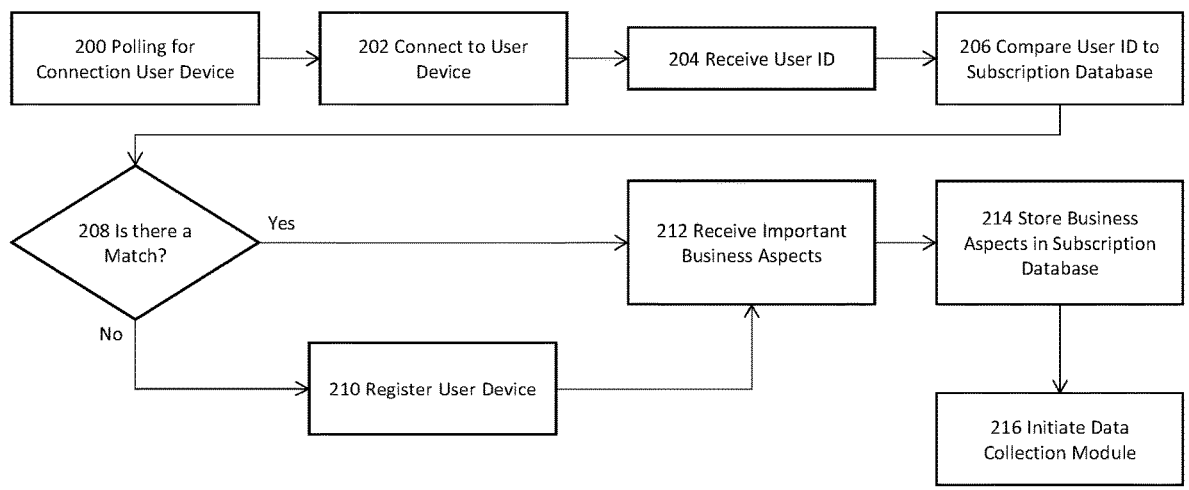
FIG. 2 Illustrates a Subscription Module of the system.

Continuing with reference to FIG. 2, the Subscription Module 104 compares the received user ID to the Subscription Database 106 in order to determine the user ID's subscription status. For example, a subscription status may be active, or deactivated, or the user may currently be using a free trial. The Subscription Module 104 compares the received user ID to the user IDs stored in the Subscription Database 106, step 206. The Subscription Module 104 determines if there is a match between the received User ID and the User IDs stored in the Subscription Database 106, step 208. If it is determined the received User ID does not match any of the User IDs in the Subscription Database 106, then the Subscription Module 104 registers the user device to use the system, step 210. For example, the Subscription Module 104 may send prompts to the user device for the user to input a User ID and a company the device should be associated with. In embodiments, a subscription may be based on a pre-existing company or enterprise level subscription, in which case the user device may only have to be registered under the pre-existing subscription to use the services provided by the server. If it is determined that the user device has an active subscription, or after the user registers the user device, the Subscription Module 104 will receive important business aspects that the user device would like to monitor through the audio data, step 212. For example the user may input, through the User Device Base Module 120, the business aspects to monitor, such as the health and wellness of the agent, buying or purchasing from potential customers, and stress levels, which are stored in the Subscription Database 106, step 214.

The business aspects stored in the Subscription Database 106 are extracted in the Algo Creation Module 114 and are used to filter the Algorithm Database 116 on the extracted business aspects. For example, the Algo Creation Module 114 may filter the Algorithm Database 116 for all of the algorithms that have as the related aspect the health and wellness of agent, buying or purchasing from potential customers, stress levels, and the like. Then the Algo Creation Module 114 filters the Algorithm Database 116 on the data point parameters received from the Correlation Module 112. The Correlation Module 112 filters the Source Database 110 for the data point parameters, selects a first parameter from the Source Database 110, and performs correlations on the unselected parameters in Source Database 110 that have the same company and first parameter. The Correlation Module 112 determines if the correlation exceeds a predetermined threshold, for example more than 95%, and if so extracts the company, the two parameters (the selected parameter and the correlated parameter). For example the event time and agent's speaking pace may be determined to be highly correlated. If so, the most reoccurring data point of that correlation is sent to the Algo Creation Module 114. For example, if the Algo Creation Module 114 receives the data point during a 15 minute event the agent's pace is 170 words per minute, then the two parameters are the event time and the agent's pace, in which case the Algo Creation Module 114 will filter the Algorithm Database 116 for the two parameters so that the database only shows algorithms that contain event time and agent's pace as the two parameters. Then the Algorithm Database 116 is filtered on the business aspects, which are inputs received from the User Device Base Module 122, the company, and the two parameters, and determines if there is a matching algorithm to be extracted, such as the one algorithm remaining within the filtered Algorithm Database 116, which is combined with other extracted algorithms using the same process in order to create a customized algorithm for the user, step 212. Vendor subscription module 104 stores the important business aspects in the Subscription Database 106, step 214. Then the subscription module 104 initiates the data collection module 108, in order to receive the data from the user and then perform correlations on the data to determine inappropriate algorithm to provide to the user device to use in the future, step 216.

Referring now to the exemplary Subscription Database 106 information shown previously as Table 1 and repeated below, the functioning of the Subscription Database 106 includes the following. Table 1 shows a portion of the Subscription Database 106 which contains the subscription status of each of the user IDs. As shown, the database contains fields (parameters) including the user ID, the company under which the user ID is registered, the status of the subscription (e.g., active, inactive, or currently using a free trial), and one or more business aspects which are important to the company or to the user. The business aspects are shown as business aspect 1, business aspect 2, up to business aspect "N", indicating there can be an arbitrary number of important business aspects stored in the database. For example, important business aspects may include the health and wellness of an agent, buying or purchasing from potential customers, stress levels, time since returning to work or returning to good health, and the like.

TABLE 1

| User ID | Company | Status | Business Aspect 1 | Business Aspect 2 | Business Aspect N |
|---------|---------|--------|-------------------|-------------------|-------------------|
| TS789654 | Comcast | Active | Heath and Wellness of Agent | Buying/Purchasing from Potential Customers | Stress Levels |
| SH123456 | Comcast | Active | Heath and Wellness of Agent | Buying/Purchasing from Potential Customers | Stress Levels |
| FE456789 | Alorica | Deactive | Return to Health | Health and Wellness of Agent | Return to Work |
| SW739123 | AT&T | Active | Stress Levels | Health and Wellness of Agent | Buying/Purchasing from Potential Customers |
| BU321657 | AT&T | Active | Stress Levels | Health and Wellness of Agent | Buying/Purchasing from Potential Customers |
| IL654729 | AT&T | Active | Stress Levels | Health and Wellness of Agent | Buying/Purchasing from Potential Customers |
| — | — | — | — | — | — |

Figure 3:
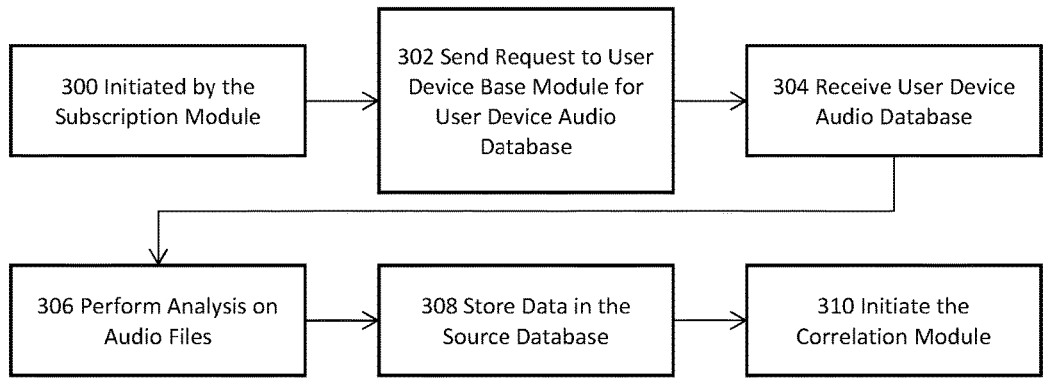
FIG. 3 Illustrates a Data Collection Module of the system.

Referring now to FIG. 3, the functioning of the Data Collection Module 108 is now described. The Data Collection Module 108 may be initiated by the Subscription Module 104, step 300, for example after the Subscription Module 104 registers the user device and receives the important business aspects of the user or company. The Data Collection Module 108 sends a request to the User Device Base Module 122 for the User Device Audio Database 124, step 302, which contains audio files collected by the User Device 120 to be used by the Server 102 to determine an appropriate algorithm that can be used by the user in the future. Then the Data Collection Module 108 receives the User Device Audio Database 124. In embodiments, there may be multiple audio files received by the data collection module 108, which may be organized for example on a call by call basis, or by user for shifts the user (e.g., a call agent) works, step 304. The Data Collection Module 108 performs an analysis on the audio files received from the User Device Base Module 122, step 306. For example, the analysis may include extracting data points from audio files such as the length of each event, how many speakers were on each event, how many words per minute the call agent spoke, how many words per minute was the client spoke, the tone, pitch or waveform frequency of the call agent's speech; the tone, pitch or waveform frequency of the client, and the like. In embodiments, the Data Collection Module 108 may receive raw audio files that do not contain any metrics or metadata, in which case this analysis needs to be performed to obtain such information. For example, the data collection module 108 may analyze a raw audio file and determine important metrics such as the length of time of a phone call or other event, the pace of the agent, the pace of the client or customer, the waveform frequency of the agent, the waveform frequency of the client, and the like. In embodiments, a behavioral analysis may be performed on the raw audio file, or agents may choose to listen to the audio file to determine metrics and/or measurements that may be useful to the server 102, step 306. The data collection module 108 then stores information of the data analysis in the source database 110. For example, the data stored in the source database 110 may include the user ID, the company, the raw audio file, and various parameters created by the analysis such as the event time and duration, the agent's pace or words spoken per minute, the client's pace or words spoken per minute, the waveform frequency of the agent's voice, the waveform frequency of the client's voice, and the like, step 308. The Data Collection Module 108 may then initiate the Correlation Module 112, in order to determine if there are any correlations for the various pieces of data stored in the Source Database 110, step 310.

Referring now to Table 2 shown below, the functioning of the Source Database 110 is now described. Table 2 shows information contained in Source Database 110, including data received from the User Device 120 and the data created from the analysis performed by the Data Collection Module 108. As shown, Source Database 110 contains general data which may include user IDs, the users' company, and links to raw audio files. The database also contains various parameter data such as event time, agent pace, client pace, agent waveform frequency, and client waveform frequency. This data is used by the Correlation Module 112 to determine if there are any correlations between the parameter data. The Correlation Module 112 filters the data from the general data, for example filtering the data for the same company (for example, Comcast) to ensure that the correlations being performed are all from the same company. In embodiments, the general data may be filtered on a specific user ID to obtain information pertaining to a particular user, such as a call agent for example.

TABLE 2

| | General | | | Parameters | | Agent Waveform | Client Waveform |
|---|---|---|---|---|---|---|---|
| User ID | Company | Audio File | Event Time | Agent Pace | Client Pace | Frequency | Frequency |
| TS789654 | Comcast | TS789654.7.20.2020.1.30.mp3 | 15 minutes | 160/wpm | 150/wpm | 255 Hz | 220 Hz |
| TS789655 | Comcast | TS789654.7.20.2020.1.45.mp3 | 45 minutes | 175/wpm | 145/wpm | 250 Hz | 260 Hz |
| TS789656 | Comcast | TS789654.7.20.2020.2.30.mp3 | 30 minutes | 180/wpm | 160/wpm | 260 Hz | 225 Hz |
| TS789657 | Comcast | TS789654.7.20.2020.3.00.mp3 | 15 minutes | 165/wpm | 170/wpm | 258 Hz | 245 Hz |
| TS789658 | Comcast | TS789654.7.20.2020.3.15.mp3 | 15 minutes | 170/wpm | 180/wpm | 255 Hz | 230 Hz |
| — | — | — | — | — | — | — | — |
| — | — | — | — | — | — | — | — |
| SH123456 | Comcast | SH123456.7.20.2020.12.00.mp3 | 15 minutes | 180/wpm | 160/wpm | 225 Hz | 250 Hz |
| SH123457 | Comcast | SH123456.7.20.2020.12.15.mp3 | 20 minutes | 185/wpm | 165/wpm | 230 Hz | 260 Hz |
| SH123458 | Comcast | SH123456.7.20.2020.12.35.mp3 | 10 minutes | 182/wpm | 163/wpm | 227 Hz | 265 Hz |
| — | — | — | — | — | — | — | — |
| — | — | — | — | — | — | — | — |

Figure 4:
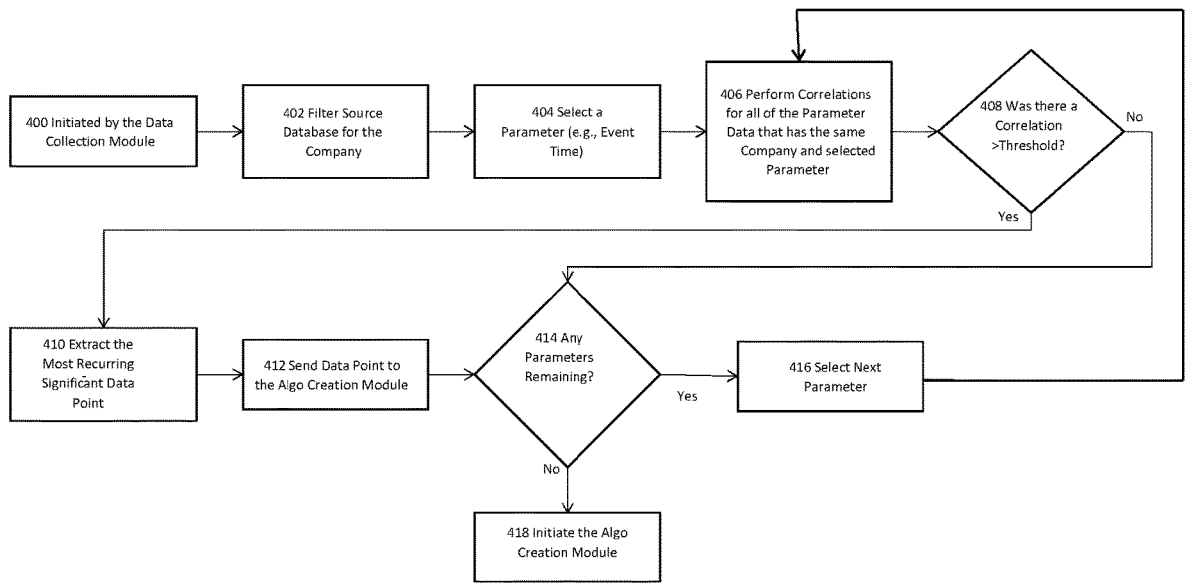
FIG. 4 Illustrates a Correlation Module of the system.

Functioning of the Correlation Module 112 will now be described with reference to FIG. 4. The Correlation Module 112 is initiated by the Data Collection Module 108, step 400. The Correlation Module 112 filters the Source Database 110 for information of a select company, step 402, and selects a first parameter to correlate with the other parameters, step 404. For example, the selected first parameter may be the event time (duration), so the Source Database 110 is filtered for the company (e.g., Comcast), and the first parameter (the event time). The Correlation Module 112 performs correlations between the first parameter and all of the other parameters, using the same set of data points for the first parameter, step 406. For example, the data filtered based on the company (e.g., Comcast), then further filtered based on a select parameter (e.g., the event time), is finally filtered on a set of values for the first parameter. In Table 2, the event time is recorded in 5 minute increments; and the event time is filtered for every recorded value of the event time (e.g., for 10, 15, 20, 30, and 45 minutes in Table 2). This same set of event time values is used to perform correlations between the event time and the other parameters. In Table 2, the other parameters include the agent's pace (i.e., the agent's words spoken per minute), the client's pace, the agent's average waveform frequency, the client's average waveform frequency, and may include other parameters as well (not shown in Table 2).

The statistically significant correlations are determined, step 408, by comparing the correlation coefficients to a select or default threshold value, for example 95%, step 408 An example of correlated parameters based on the foregoing may determine the correlation between the event time data point of 15 minutes and the client's average waveform frequency has a correlation coefficient of 15%. This is below the 95% threshold, so the correlation may be deemed statistically insignificant (i.e., not of importance), and may be ignored. Correlations between the event time and the clients' average waveform frequency based on the other values of event time in Table 2 would similarly be determined. The client's average waveform frequency may likewise be determined to be unimportant for all recorded values of the event time. It is then ascertained whether any parameters remain for which a correlation has not been determined, step 414. If so, the Correlation Module 112 selects the next parameter, step 416, for example the next parameter may be the agent's pace, the client's pace, etc. This parameter is then used as the parameter to perform correlations with all of the other parameters, step 406, and the Correlation Module 112 continues from there. If not, the Algo Creation Module 114 is initiated, step 418.

Conversely, correlations performed between the event time and the clients' average waveform frequency for all recorded values of event time in Table 2 may be determined to be statistically significant for one or more of the recorded values of the event time, step 408. If so, the most recurring data point for which the correlation is greater than the threshold is extracted, step 410, and this data point and the company identity are sent to the Algo Creation Module 114, step 412. It is then ascertained whether any parameters remain for which a correlation has not been performed, step 414. If so, a next parameter is selected, step 416, and is used as the parameter to perform correlations with all of the other parameters, step 406. If not, the Algo Creation Module 114 is initiated, step 418.

It is worth noting the correlation coefficient may be influenced by variations in the clients' or customers' audio input devices, such as the microphones on clients' phones, or clients using speaker phones, or headsets, or wireless headphones with microphones. These may skew parameter values because the values are collected in different environments. Correlation determinations made at different times may yield different results. For example, correlation determinations for Comcast on a different day may include a statistically significant correlation between an event time of 15 minutes and the agent's speaking pace. For example, the correlation coefficient may be 96%, which is above the 95% threshold. The most frequently occurring statistically significant data point may then be extracted and sent to the Algo Creation Module 114 (e.g., agents' average speaking rate of 170 words per minute at an event time of 15 minutes), step 406.

The functioning of the Algo Creation Module 114 will now be explained with reference to FIG. 5. The Algo Creation Module 114 is initiated by the Correlation Module 112, step 500. The Algo Creation Module 114 receives the extracted data point and the company from the Correlation Module 112. For example, the Algo Creation Module 114 may receive the data point during a 15 minute event the agent's pace is 170 words per minute, which was determined in the process described in the Correlation Module 112 to be statistically significant since there was a high correlation with a 15 minute event and agent's pace for the agents within Comcast. Since these highly correlated parameters, event time and agent's pace, have a re-occurring data point of 15 minutes and agent's pace being 170 words per minute, from all the agent's within the company of Comcast, the re-occurring data point can be used as a rule within the new algorithm to further assist agent's in the future. for example if an agent is speaking below 170 words per minute during 15 minute events, the agent may be prompted by the new algorithm to speak faster, step 502. Then the Algo Creation Module 114 filters the Subscription Database 106 on the company received from the Correlation Module 112, step 504. The Algo Creation Module 114 extracts the business aspects from the Subscription Database 106 that are related to the filtered company, for example if the company was Comcast, one of the employees at Comcast would input the business aspects during the process described in the User Device Base Module 122 and the inputs are sent to the Subscription Module 104 on the Server 102 and stored in the Subscription Database 106 for example the extracted business aspects would be the health and wellness of the agent, buying or purchasing from potential customers, and stress levels, step 506. Then the Algo Creation Module 114 filters the Algorithm Database 116 on the extracted business aspects, for example the Algo Creation Module 114 would filter the Algorithm Database 116 for all of the algorithms that have health and wellness of agent, buying or purchasing from potential customers, and stress levels as the related aspect, step 508. Then the Algo Creation Module 114 filters the Algorithm Database 116 on the received data point parameters from the Correlation Module 112. For example, if the Algo Creation Module 114 receives the data point during a 15 minute event the agent's pace is 170 words per minute, then the two parameters are the event time and the agent's pace, in which case the Algo Creation Module 114 will filter the Algorithm Database 116 for the two parameters so that the database only shows algorithms that contain event time and agent's pace as the two parameters, step 510. The Algo Creation Module 114 then searches the filtered Algorithm Database 116 for the corresponding algorithm, step 512. Then the Algo Creation Module 114 determines if there is a match for any algorithms remaining with the filters from the business aspects and the two parameters from the extracted data point, step 514. If it is determined that there is an algorithm remaining with the filters provided by the Algo Creation Module 114, then the Algo Creation Module 114 extracts the algorithm. For example, if the Algorithm Database 116 is filtered for the related aspect to be the health and wellness of the agent and the two parameters being event time and the agent's pace, the remaining algorithm would be algorithm ID ET.AP.456 and the Algo Creation Module would extract the algorithm data file ET.AP.456.dat which has the rule "if agent pace is below extracted data point, notify agent to speak faster", step 516. If it is determined that there is no match or if there are no algorithms remaining with the filters provided by the Algo Creation Module, or if the algorithm has already been extracted, the Algo Creation Module 114 then determines if there is another received data point from the Correlation Module 112. If it is determined that there is another data point received from the Correlation Module 112 the process returns to step 510 in order to continue building the algorithm for the client, step 518. If it is determined that there are no more extracted data points from the Correlation Module 112, the Algo Creation Module 114 combines the extracted algorithms. For example, the combination of the algorithms may be having the algorithms be performed in a sequence, such as 1st algorithm extracted then 2nd algorithm extracted and so on, also the combination of the algorithms may be having the algorithms performed simultaneously. In some embodiments, the created algorithm may be sent to the User Device 120 in order for the created algorithm to be performed locally, in real-time or near real-time on the User Device 120. In some embodiments, the created algorithm may be stored in the Subscription Database, which would allow the received audio files from the User Device Base Module 122 to be processed by the created algorithm, in real-time or near real-time, in order to provide feedback to the User Device 120 during an event or phone call, step 520.

Functioning of the Algorithm Database 116 will now be explained with reference to Table 3, below. This table displays the Algorithm Database 116, which is used by the Algo Creation Module 114, to create a custom algorithm based on the user or a company's business aspects which the user or a company feel is of importance. The database contains an algorithm ID, parameter 1, parameter 2, the related aspect for the algorithm, the algorithm data file, and the algorithm rule. For example, an algorithm ID may be "ET.AP.456", parameter one may be "event time", parameter 2 may be the "agent's pace", the related aspect may be the "health and wellness of an agent", the algorithm data file may be "ET.AP.456.dat", and the algorithm rule may be "if agent pace is below extracted data point, notify agent to speak faster". The Algorithm Database 116 when being used by the Algo Creation Module 114 processes multiple filters provided by the Algo Creation Module 114. For example, the Algo Creation Module 114 may receive from the Correlation Module 112 an extracted data point and a company, in which the Algo Creation Module 114 filters the Subscription Database 106 to extract the user's or a company's business aspects which are deemed important. Then the Algo Creation Module 114 determines the two parameters from the extracted data point received from the Correlation Module 112, for example the parameters "event time" and "agent pace". With these various filters performed by the Algo Creation Module 114 the remaining algorithms in the Algorithm Database 116 can be extracted, for example the algorithm data file and the algorithm rule, and combined to be used by the user or a company in order to determine if an agent is cohering to the important business aspects inputted by the User Device 120, element 800.

TABLE 3

| Algorithm ID | Parameter 1 | Parameter 2 | Related Aspect | Algorithm Data File | Algorithm Rule |
| --- | --- | --- | --- | --- | --- |
| ET.AP.456 | Event Time | Agent Pace | Health and Wellness of Agent | ET.AP.456.dat | If Agent Pace is below extracted data point, Notify Agent to speak faster |
| ET.CP.789 | Event Time | Client Pace | Buying/Purchasing from Potential Customers | ET.CP.789.dat | If Client Pace is above extracted data point, Provide Agent with Alert to Destress Customer |
| ET.AWF.852 | Event Time | Agent Waveform Frequency | Stress Levels | ET.AWF.852.dat | If Agent Waveform Frequency is above extracted data point, Inform Agent to take a 5 minute break before next call |

TABLE 3-continued

| Algorithm ID | Parameter 1 | Parameter 2 | Related Aspect | Algorithm Data File | Algorithm Rule |
|---|---|---|---|---|---|
| ET.CWF.147 | Event Time | Client Waveform Frequency | Stress Levels | ET.CWF.147.dat | If Client Waveform Frequency is above extracted data point, Inform Agent to Calm Customer |
| AP.AWF.963 | Agent Pace | Agent Waveform Frequency | Health and Wellness of Agent | AP.AWF.963.dat | If Agent Waveform Frequency is above extracted data point, inform Agent to take a 10 minute break |
| CP.CWF.537 | Client Pace | Client Waveform Frequency | Buying/Purchasing from Potential Customers | CP.CWF.537.dat | If Client Waveform Frequency is above extracted data point, Inform Agent to offer Client a Coupon |
| AP.CP.843 | Agent Pace | Client Pace | Return to Work | AP.CP.843.dat | If Client Pace is above extracted data point, Notify Agent to Speak Slower |
| AWF.CWF.159 | Agent Waveform Frequency | Client Waveform Frequency | Return to Health | AWF.CWF.159.dat | If Client Waveform Frequency is above extracted data point, Notify Agent to speak louder |
| AWF.CP.369 | Agent Waveform Frequency | Client Pace | Health and Wellness of Agent | AWF.CP.369.dat | If Client Pace is above extracted data point, Notify Agent to speak softer |
| — | — | — | — | — | — |

Functioning of the User Device Base Module 122 will now be explained with reference to FIG. 6. The process begins with the User Device Base Module 122 connecting to the Subscription Module 104, step 600. Then the User Device Base Module 122 sends the User ID, for example a user ID may be TS789654, step 602. Then it is determined if the device is registered to the server, for example the User ID that is sent to the Subscription Module 104 is compared to the Subscription Database 106 which contains all of the various user IDs, companies the user IDs belong to, and the status of the subscription, step 604. If it is determined that the User ID is not registered, the user sends the device information to the Subscription Module 104 in order to register the device. For example, the user will input the User ID, if the ID is not already being used by another user, the company in which the user is employed by or the company which owns the device, etc. In some embodiments, the user may have to only register the device and not sign-up for a subscription if the company they are employed by already has an account with the server, step 606. If it is determined that the User ID is registered or once the user registers the device, the User Device Base Module 122 sends the business aspects that are either important to the company or to the specific user. For example, the user may input the business aspects on the User Device via a GUI, or through prompts provided by the Subscription Module 104, step 608. Then the User Device Base Module 122 is continuously polling for a request from the Data Collection Module 108 to send the User Device Audio Database 124, step 610. The User Device Base Module 122 receives the request from the Data Collection Module 108 for the User Device Audio Database 124, step 612. Then the User Device Base Module 122 sends the User Device Audio Database 124 to the Data Collection Module 108, step 614.

Functioning of the User Device Audio Database 124 will now be explained with reference to Table 4, below. This table displays the User Device Audio Database 124, which contains the audio data collected from the User Device 120 that the user wants to send to the server for the analysis and algorithm creation to be performed. The database contains the user ID, for example TS 789654, the company, for example Comcast, and the audio file, which for example may be stored as a separate audio file for each call the user completes. In some embodiments, the audio file may be one large file that contains the audio from the user's entire workday.

TABLE 4

| User ID | Company | Audio File |
|---|---|---|
| TS789654 | Comcast | TS789654.7.20.2020.1.30.mp3 |
| TS789655 | Comcast | TS789654.7.20.2020.1.45.mp3 |
| TS789656 | Comcast | TS789654.7.20.2020.2.30.mp3 |
| TS789657 | Comcast | TS789654.7.20.2020.3.00.mp3 |
| TS789658 | Comcast | TS789654.7.20.2020.3.15.mp3 |
| — | — | — |

The present model-as-a-service method includes allowing a user to set up a model for speech recognition based on business needs, creating a subscription based upon the use of the model, and implementing that model. The model allows for at least two of the steps of: storing received audio data on a server, extracting audio patterns that deal with business needs, executing a correlation module, creating the correlations to the audio patterns, and executing an algorithm creation module. The method further includes, after the model for speech recognition based upon business needs is set up and the subscription created, storing the audio data on the server, performing correlations on the stored audio data, determining key features of the audio data, identifying key features of the audio data based on user needs, comparing the key features to previous algorithms, and creating a new algorithm to be used by the user in order to determine user's emotional and/or mental states and changing, based upon the subscription.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The invention claimed is:

1. A model-as-a-service system comprising:
   a server including:
      a subscription module;
      a subscription database;
      a data collection module;
      a source data base;
      a correlation module;
      an algorithm creation module; and
      an algorithm database;

a data communication network communicatively coupled to the server at a first network location; and
a user device communicatively coupled to the network at a second network location,
wherein a user device base module is configured to:
   communicatively connect to the subscription module;
   send a user ID to the subscription module;
   in the case the user is not registered, send user device information to the subscription module for registration;
   send important business aspects of the user to the subscription module;
   repeatedly poll for a request, from the data collection module, for the user device to send a user device audio database, and receive the request; and
   send the user device audio database to the data collection module.

2. The system of claim 1, wherein the subscription module is configured to:
   poll the user device for connection information;
   communicatively connect to the user device;
   receive a user ID from the user device;
   compare the received user ID to the subscription database and determine whether the user ID matches an entry in the subscription database;
   in the case the user ID does not match an entry in the subscription database, register the user device, including:
      storing the user ID in the subscription database,
      receiving important business aspects from the user device,
      storing the received business aspects in the subscription database; and
      initiating the data collection module.

3. The system of claim 1, wherein the data collection module is configured to:
   send a request to the user device base module for an audio database of the user device;
   receive the requested audio database from the user device;
   analyze audio files stored in the received audio database;
   store data pertaining to the analyzed audio files in the source database; and
   initiate the correlation module.

4. The system of claim 1, wherein the correlation module is configured to:
   filter the source database for parameters of data stored in the source database;
   send the parameters to the algorithm creation module, including:
      select a first parameter of the stored information,
      correlate the first parameter data with data of additional parameters of the stored information,
      determine whether there is a correlation greater than 95% between data of the first parameter and data of any of the additional parameters,
      in the case there is a correlation greater than 95%, extract a most recurring datapoint of the first parameter for each of the additional parameters,
      send information of the most recurring datapoint to the algorithm creation module,
      determine whether there is a non-correlated parameter of the stored information;
      in the case there is a non-correlated parameter, select the non-correlated parameter as a new first parameter, and
      return to the step of correlating first parameter data with data of additional parameters of the stored information, and proceed from there until there are no non-correlated parameters remaining; and
   initiate the algorithm creation module.

5. The system of claim 1, wherein the algorithm creation module is configured to:
   receive correlation data points from the correlation module;
   filter the subscription database for subscriber information of the user;
   extract from the subscription database important business aspects of the user;
   filter the algorithm database on the extracted business aspects;
   select an unselected one of the received data points;
   filter the algorithm database on parameters of the selected data point;
   search the filtered algorithm database for algorithms corresponding to the data point;
   in the case there is a match, extract the corresponding algorithm;
   in the case there is another unselected received datapoint, select the unselected received datapoint as a new selected data point and return to the step of filtering the algorithm database on parameters of the new selected datapoint, and proceed from there; and
   combine the extracted algorithms as a created algorithm for use in real- or near real-time information of the user device.

6. A model-as-a-service method comprising:
   obtaining a server including:
      a subscription module,
      a subscription database,
      a data collection module,
      a source data base,
      a correlation module,
      an algorithm creation module, and
      an algorithm database;
   communicatively coupling the server to a data communication network at a first network location; and
   communicatively coupling a user device to the network at a second network location,
   wherein a user device base module performs the steps comprising:
      communicatively connecting to the subscription module;
      sending a user ID to the subscription module;
      in the case the user device is not registered, sending information of the user device to the subscription module;
      sending, to the subscription module, important business aspects of the user device;
      repeatedly polling for a request, from the data collection module, for the user device to send a user device audio database, and receiving the request; and
      sending the user device audio data base to the data collection module.

7. The method of claim 6, wherein the subscription module performs the steps comprising:
   polling the user device for connection information;
   communicatively connecting to the user device;
   receiving a user ID from the user device;
   comparing the received user ID to the subscription database and determining whether the user ID matches an entry in the subscription database;
   in the case the user ID does not match an entry in the subscription database, registering the user device, including:

storing the user ID in the subscription database,
receiving important business aspects from the user device,
storing the received business aspects in the subscription database; and
initiating the data collection module.

8. The method of claim 6, wherein the data collection module performs the steps comprising:
sending a request to the user device base module for an audio database of the user device;
receiving the requested audio database from the user device;
analyzing audio files stored in the received audio database;
storing data pertaining to the analyzed audio files in the source database; and
initiating the correlation module.

9. The method of claim 6, wherein the correlation module performs the steps comprising:
filtering the source database for data of parameters of a company;
sending the company parameters data to the algorithm creation module, including:
selecting a first parameter of the company information,
correlating data of the first parameter with data of additional parameters of the company information,
determining whether there is a correlation greater than 95% between the first parameter and any of the additional parameters,
in the case there is a correlation greater than 95%, extracting a most recurring datapoint of the first parameter for each of the additional parameters,
sending information of the most recurring datapoint to the algorithm creation module,
determining whether there is a non-correlated parameter remaining,
in the case there is a non-correlated parameter remaining, selecting the non-correlated parameter as a new first parameter,
returning to the step of correlating data of the first parameter with data of additional parameters using the new first parameter; and
when there are no remaining non-correlated parameters remaining, initiating the algorithm creation module.

10. The method of claim 6, wherein the algorithm creation module is configured to perform the steps comprising:
receiving, from a correlation module, correlation data points and corresponding company information;
filtering a subscription database for information on the company;
extracting from the subscription database important business aspects of the company;
filtering an algorithm database on the extracted business aspects;
selecting an unselected one of the received data points;
filtering the algorithm database on parameters of the selected data point;
searching the filtered algorithm database for algorithms corresponding to the data point;
in the case there is a match, extracting the corresponding algorithm;
in the case there is another unselected received datapoint, returning to the step of selecting an unselected one of the received data points; and
combining the extracted algorithms as a created algorithm for use in real or near real time on information of the user device.

11. A model-as-a-service system comprising:
a server including, a subscription module, a subscription database, a data collection module, a source data base, a correlation module, an algorithm creation module, and an algorithm database;
a data communication network communicatively coupled to the server at a first network location; and
a user device communicatively coupled to the network at a second network location,
wherein the correlation module is configured to:
filter the source database for parameters of data stored in the source database;
send the parameters to the algorithm creation module, including:
select a first parameter of the stored information,
correlate the first parameter data with data of additional parameters of the stored information,
determine whether there is a correlation greater than 95% between data of the first parameter and data of any of the additional parameters,
in the case there is a correlation greater than 95%, extract a most recurring datapoint of the first parameter for each of the additional parameters,
send information of the most recurring datapoint to the algorithm creation module,
determine whether there is a non-correlated parameter of the stored information;
in the case there is a non-correlated parameter, select the non-correlated parameter as a new first parameter, and
return to the step of correlating first parameter data with data of additional parameters of the stored information, and proceed from there until there are no non-correlated parameters remaining; and
initiate the algorithm creation module.

12. The system of claim 11, wherein the subscription module is configured to:
poll the user device for connection information;
communicatively connect to the user device;
receive a user ID from the user device;
compare the received user ID to the subscription database and determine whether the user ID matches an entry in the subscription database;
in the case the user ID does not match an entry in the subscription database, register the user device, including:
storing the user ID in the subscription database,
receiving important business aspects from the user device,
storing the received business aspects in the subscription database; and
initiating the data collection module.

13. A model-as-a-service system comprising:
a server including a subscription module, a subscription database, a data collection module, a source data base, a correlation module, an algorithm creation module, and an algorithm database;
a data communication network communicatively coupled to the server at a first network location; and
a user device communicatively coupled to the network at a second network location,
wherein the algorithm creation module is configured to:
receive correlation data points from the correlation module;
filter the subscription database for subscriber information of the user;

extract from the subscription database important business aspects of the user;
filter the algorithm database on the extracted business aspects;
select an unselected one of the received data points;
filter the algorithm database on parameters of the selected data point;
search the filtered algorithm database for algorithms corresponding to the data point;
in the case there is a match, extract the corresponding algorithm;
in the case there is another unselected received datapoint, select the unselected received datapoint as a new selected data point and return to the step of filtering the algorithm database on parameters of the new selected datapoint, and proceed from there; and
combine the extracted algorithms as a created algorithm for use in real- or near real-time information of the user device.

14. The system of claim 13, wherein the data collection module is configured to:
send a request to a user device base module for an audio database of the user device;
receive the requested audio database from the user device;
analyze audio files stored in the received audio database;
store data pertaining to the analyzed audio files in the source database; and
initiate the correlation module.

15. A model-as-a-service method comprising:
obtaining a server including:
a subscription module,
a subscription database,
a data collection module,
a source data base,
a correlation module,
an algorithm creation module, and
an algorithm database;
communicatively coupling the server to a data communication network at a first network location; and
communicatively coupling a user device to the network at a second network location,
wherein the correlation module performs the steps comprising:
filtering the source database for data of parameters of the company;
sending a company parameters data to the algorithm creation module, including:
selecting a first parameter of the company information,
correlating data of the first parameter with data of additional parameters of the company information,
determining whether there is a correlation greater than 95% between the first parameter and any of the additional parameters,
in the case there is a correlation greater than 95%, extracting a most recurring datapoint of the first parameter for each of the additional parameters,
sending information of the most recurring datapoint to the algorithm creation module,
determining whether there is a non-correlated parameter remaining,
in the case there is a non-correlated parameter remaining, selecting the non-correlated parameter as a new first parameter,
returning to the step of correlating data of the first parameter with data of additional parameters using the new first parameter; and
when there are no remaining non-correlated parameters remaining, initiating the algorithm creation module.

16. The method of claim 15, wherein the subscription module performs the steps comprising:
polling the user device for connection information;
communicatively connecting to the user device;
receiving a user ID from the user device;
comparing the received user ID to the subscription database and determining whether the user ID matches an entry in the subscription database;
in the case the user ID does not match an entry in the subscription database, registering the user device, including:
storing the user ID in the subscription database,
receiving important business aspects from the user device,
storing the received business aspects in the subscription database; and
initiating the data collection module.

17. A model-as-a-service method comprising:
obtaining a server including:
a subscription module,
a subscription database,
a data collection module,
a source data base,
a correlation module,
an algorithm creation module, and
an algorithm database;
communicatively coupling the server to a data communication network at a first network location; and
communicatively coupling a user device to the network at a second network location,
wherein the algorithm creation module is configured to perform the steps comprising:
receiving, from a correlation module, correlation data points and corresponding company information;
filtering a subscription database for information on the company;
extracting from the subscription database important business aspects of the company;
filtering an algorithm database on the extracted business aspects;
selecting an unselected one of the received data points;
filtering the algorithm database on parameters of the selected data point;
searching the filtered algorithm database for algorithms corresponding to the data point;
in the case there is a match, extracting the corresponding algorithm;
in the case there is another unselected received datapoint, returning to the step of selecting an unselected one of the received data points; and
combining the extracted algorithms as a created algorithm for use in real or near real time on information of the user device.

18. The method of claim 17, wherein the data collection module performs the steps comprising:
sending a request to a user device base module for an audio database of the user device;
receiving the requested audio database from the user device;
analyzing audio files stored in the received audio database;

storing data pertaining to the analyzed audio files in the source database; and
initiating the correlation module.

\* \* \* \* \*